US009723457B2

United States Patent
Brahmi et al.

(10) Patent No.: US 9,723,457 B2
(45) Date of Patent: Aug. 1, 2017

(54) CLUSTER-BASED RESOURCE ALLOCATION FOR VEHICLE-TO-VEHICLE COMMUNICATION

(71) Applicant: Telefonaktiebolaget LM Ericsson (publ), Stockholm (SE)

(72) Inventors: Nadia Brahmi, Aachen (DE); Shehzad Ali Ashraf, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/915,577

(22) PCT Filed: Sep. 6, 2013

(86) PCT No.: PCT/EP2013/068441
§ 371 (c)(1),
(2) Date: Feb. 29, 2016

(87) PCT Pub. No.: WO2015/032436
PCT Pub. Date: Mar. 12, 2015

(65) Prior Publication Data
US 2016/0212596 A1      Jul. 21, 2016

(51) Int. Cl.
*H04W 4/08* (2009.01)
*H04L 29/08* (2006.01)
(Continued)

(52) U.S. Cl.
CPC ........... *H04W 4/08* (2013.01); *H04L 41/0893* (2013.01); *H04L 67/12* (2013.01); *H04W 4/026* (2013.01);
(Continued)

(58) Field of Classification Search
CPC . H04W 4/08; H04W 72/042; H04W 72/0413; H04W 4/027; H04W 4/026;
(Continued)

(56) References Cited

U.S. PATENT DOCUMENTS

2007/0160016 A1* 7/2007 Jain ..................... H04W 52/367
370/338
2012/0106517 A1* 5/2012 Charbit ................. H04W 72/04
370/336
(Continued)

FOREIGN PATENT DOCUMENTS

WO    WO 2010/082084 A1    7/2010

OTHER PUBLICATIONS

International Search Report, Application No. PCT/EP2013/068441, Feb. 6, 2014.
(Continued)

*Primary Examiner* — Nathan Mitchell
(74) *Attorney, Agent, or Firm* — Sage Patent Group

(57) ABSTRACT

A vehicle-to-vehicle (V2V) communication device manages a cluster including the V2V communication device and at least one of other V2V communication device. The V2V communication device determines a cluster description specifying one or more characteristics of the cluster indicates the cluster description over a cellular network to a network node. The network node receives the cluster description and, on the basis of the received cluster description, assigns to the cluster a set of resources for V2V communication. The network node sends a resource assignment over the cellular network to the V2V communication device. The resource assignment indicates the assigned set of resources. The V2V communication device receives the resource assignment and assigns resources from the set of resources to the V2V communication devices of the cluster. Further, the V2V communication device indicates the assigned resources to the at least one further V2V communication device of the cluster.

30 Claims, 16 Drawing Sheets

(51) Int. Cl.
| | | |
|---|---|---|
| H04L 12/24 | (2006.01) | |
| H04W 76/02 | (2009.01) | |
| H04W 4/02 | (2009.01) | |
| H04W 28/26 | (2009.01) | |
| H04W 72/04 | (2009.01) | |
| H04W 4/00 | (2009.01) | |
| H04W 84/04 | (2009.01) | |

(52) U.S. Cl.
CPC ......... H04W 4/027 (2013.01); H04W 72/042 (2013.01); H04W 72/0413 (2013.01); H04W 76/023 (2013.01); H04W 4/00 (2013.01); H04W 28/26 (2013.01); H04W 72/0406 (2013.01); H04W 84/042 (2013.01)

(58) Field of Classification Search
CPC ... H04W 76/023; H04W 84/042; H04W 4/00; H04W 72/0406; H04W 28/26; H04L 41/0893; H04L 67/12
See application file for complete search history.

(56) References Cited

U.S. PATENT DOCUMENTS

| | | | | |
|---|---|---|---|---|
| 2012/0257530 | A1 | 10/2012 | Bijwaard et al. | |
| 2012/0322484 | A1* | 12/2012 | Yu | H04W 4/08 455/509 |
| 2013/0148526 | A1* | 6/2013 | Hwang | H04W 4/08 370/252 |
| 2013/0150061 | A1* | 6/2013 | Shin | H04W 4/005 455/450 |
| 2014/0302774 | A1* | 10/2014 | Burke | H04H 20/57 455/3.05 |
| 2014/0328241 | A1* | 11/2014 | Subramanian | H04W 72/005 370/312 |
| 2015/0004901 | A1* | 1/2015 | Agiwal | H04W 76/023 455/39 |
| 2015/0195827 | A1* | 7/2015 | Feng | H04W 4/206 380/270 |
| 2015/0282210 | A1* | 10/2015 | Li | H04W 74/004 455/436 |
| 2015/0304902 | A1* | 10/2015 | Yu | H04W 36/165 455/436 |
| 2016/0014589 | A1* | 1/2016 | Niu | H04W 74/02 370/329 |
| 2016/0021526 | A1* | 1/2016 | Niu | H04W 74/02 370/230 |
| 2016/0044704 | A1* | 2/2016 | Li | H04W 76/00 370/330 |
| 2016/0183219 | A1* | 6/2016 | Kim | H04W 72/0406 370/329 |
| 2016/0205665 | A1* | 7/2016 | Fukuta | H04W 72/02 455/454 |
| 2016/0205713 | A1* | 7/2016 | Seo | H04W 72/121 370/280 |

OTHER PUBLICATIONS

Written Opinion of the International Searching Authority, Application No. PCT/EP2013/068441, Feb. 6, 2014.
Araniti et al., "LTE for Vehicular Networking: A Survey", *IEEE Communications Magazine*, May 2013, pp. 148-157.
Booysen et al. "Survey of media access control protocols for vehicular ad hoc networks", *IET Communications*, vol. 5, Iss. 11, Jul. 22, 2011, pp. 1619-1631.
ETSI, Technical Specification—"Intelligent Transport Systems (ITS); Vehicular Communications; Basic Set of Applications; Part 3: Specifications of Decentralized Environmental Notification Basic Service", ETSI TS 102 637-3 V1.1.1 (Sep. 2010), 46 pp.
Günter et al., "Cluster-based Medium Access Scheme for VANETs", *IEEE Intelligent Transportation Systems Conference (ITSC 2007)*, Seattle, WA, Sep. 30-Oct. 3, 2007, pp. 343-348.
Rémy et al, "LTE4V2X: LTE for a Centralized VANET Organization", *2011 IEEE Global Telecommunications Conference (GLOBALCOM)*, Houston, TX, Dec. 5-9, 2011, 6 pp.
Su et al., "Cluster-Based DSRC Architecture for QoS Provisioning over Vehicle Ad Hoc Networks", *2006 IEEE Global Telecommunications Conference (GLOBALCOM '06)*, San Francisco, CA, Nov. 27, 2006, 5 pp.
Xu et al., "A Study on Clustering Algorithm of VANET Environment", *2012 3rd IEEE International Conference on Network Infrastructure and Digital Content (IC-NIDC)*, Beijing, Sep. 21-23, 2012, pp. 204-208.

* cited by examiner

| FRAME TYPE | REQUEST TYPE | CH ID | SIZE |

FIG. 11

| DEVICE ID | FRAME TYPE | REQUEST TYPE | CH ID | ADDRESS |
|---|---|---|---|---|

FIG. 12

CLUSTER-BASED RESOURCE ALLOCATION FOR VEHICLE-TO-VEHICLE COMMUNICATION

CROSS REFERENCE TO RELATED APPLICATION

This application is a 35 U.S.C. §371 national stage application of PCT International Application No. PCT/EP2013/068441, filed on Sep. 6, 2013, the disclosure and content of which is incorporated by reference herein in its entirety. The above-referenced PCT International Application was published in the English language as International Publication No. WO 2015/032436 A1 on Mar. 12, 2015.

TECHNICAL FIELD

The present invention relates to methods for controlling vehicle-to-vehicle communication and to corresponding devices.

BACKGROUND

In vehicular transport and traffic management, it is known to use Intelligent Transport System (ITS) applications for supporting drivers. In this way, traffic safety can be improved by providing the drivers with information which allows for making smarter decisions. Such ITS applications may involve transmitting information between different vehicles, e.g., in the form of a Cooperative Awareness Message (CAM). The information may be used for providing a warning or guidance to the driver, e.g., in the form of an emergency vehicle warning, an intersection collision warning, a slow vehicle warning, or a motorcycle approaching indication. The information may be transmitted using a radio technology for vehicle-to-vehicle (V2V) communication, e.g., as specified by the IEEE 802.11p standard, also referred to as WAVE (Wireless Access in Vehicular Environments). According to the IEEE 802.11p standard, a wireless ad-hoc network may be formed between different vehicles. Such ad-hoc networks are also referred to as Vehicular Ad-Hoc Network (VANET).

CAMs are messages which are typically periodically broadcast by a vehicle to inform nearby vehicles about the current status of the vehicle. CAMs may for example be used for transmitting the current geographical position, speed, and/or basic attributes of the vehicle. A vehicle may receive CAMs from other vehicles and utilize the information provided in the CAMs for supporting its operator, e.g., by providing a warning or other guidance.

More details on CAMs can be found in ETSI TS 102 637-3 "Intelligent Transport Systems (ITS); Vehicular Communications; Basic Set of Applications; Part 2: Specification of Cooperative Awareness Basic Service". Here, a generation of cooperative applications is described, which are based on the IEEE 802.11p specifications. The traffic model for the transmission of such CAM messages is specified to use periodic broadcast traffic consisting of approx. 500 payload bytes with a repetition rate 5-10 Hz and event-driven broadcast traffic consisting of approx. 500 payload bytes. Both traffic types may exist at the same time.

The ad-hoc network according to IEEE 802.11p is a contention based system, in which different V2V communication devices compete for access to the same radio channel. Accordingly, there is also a risk of colliding access attempts by different V2V communication devices. Such collisions may in turn result in delays until a V2V communication device successfully gains access to the radio channel.

In "LTE4V2X: LTE for a Centralized VANET Organization" by G. Remy et al., IEEE Globecom Proceedings (2011), it is proposed to use infrastructure of a cellular network to organize a VANET into clusters of V2V communication devices. In this case, the cellular network is based on the LTE (Long Term Evolution) technology specified by 3GPPP (3rd Generation Partnership Project). In particular, it is described that a base station of the cellular network, referred to as eNodeB (eNB), may organize a cluster formed of a cluster head (CH) and cluster members (CMs). Over the cellular network, the eNB receives Floating Car Data (FCD) from multiple V2V communication devices and uses this information to elect the CH and associate the CMs to the cluster. The eNB then broadcasts a cluster description over the cellular network. The cluster description indicates the identity of the CH and the identities of the CMs. By receiving such cluster description, a V2V communication device is informed about the cluster to which it is assigned.

Within the cluster, the CH acts as a gateway between the CMs and the cellular network. Specifically, the CH aggregates FCD transmitted by the CMs over the VANET and sends the aggregated FCD data over the cellular network to the eNB. For the VANET communication within the cluster, Time Division Multiple Access (TDMA) is used by the CMs. Specifically, each CM uses a different time slot, derived from the order of the identities of the CMs in the cluster description.

However, the above LTE4V2X solution is not optimized for transmission of CAMs between V2V communication devices. Rather, the VANET communication mainly consists in communication of FCD from the CMs to the CH. In the case of CAMs it is in turn desired that typically all V2V communication devices within a certain communication range can receive the CAMs. This may in turn cause collisions of CAM transmissions. In the LTE4V2X solution, collisions between VANET transmissions within a cluster can be avoided. However, collisions between VANET transmissions of different clusters are not addressed. Still further, the centralized management of the clusters may cause significant load on the cellular network and requires cellular connectivity for each V2V communication device.

Accordingly, there is a need for techniques which allow for efficiently utilizing a cellular network for management of V2V communication over a VANET.

SUMMARY

According to an embodiment of the invention, a method of controlling V2V communication is provided. According to the method, a V2V device manages a cluster comprising the V2V communication device and at least one further V2V communication device. The V2V communication device determines a cluster description specifying one or more characteristics of the cluster. The V2V communication device sends the cluster description over a cellular network to a network node. Further, the V2V communication device receives a resource assignment over the cellular network from the network node. The resource assignment indicates a set of resources for V2V communication assigned to the cluster. The V2V communication device assigns resources from the set of resources to the V2V communication devices of the cluster, and the V2V communication device indicates the assigned resources to the at least one further V2V communication device of the cluster.

According to a further embodiment of the invention, a method for controlling V2V communication is provided. According to the method, a network node receives a cluster description over a cellular network from a V2V communication device. The cluster description specifies one or more characteristics of a cluster comprising the V2V communication device and at least one further V2V communication device. On the basis of the received cluster description, the network node assigns to the cluster a set of resources for V2V communication, and sends a resource assignment over the cellular network to the V2V communication device. The resource assignment indicates the assigned set of resources.

According to a further embodiment of the invention, a V2V communication device is provided. The V2V device comprises a first radio interface for V2V communication with one or more other V2V communication devices, and a second radio interface for communication over a cellular network with a network node. Further, the V2V device comprises at least one processor. The at least one processor is configured to manage a cluster comprising the V2V communication device and at least one of the other V2V communication devices. Further, the at least one processor is configured to determine a cluster description specifying one or more characteristics of the cluster and to indicate the cluster description over the cellular network to the network node. Further, the at least one processor is configured to receive a resource assignment over the cellular network from the network node. The resource assignment indicates a set of resources for V2V communication assigned to the cluster. Further, the at least one processor is configured to assign resources from the set of resources to the V2V communication devices of the cluster, and to indicate the assigned resources to the at least one further V2V communication device of the cluster.

According to a further embodiment of the invention, a network node is provided. The network node comprises an interface for communication over a cellular network with a V2V communication device. Further, the network node comprises at least one processor. The at least one processor is configured to receive a cluster description over the cellular network from the V2V communication device. The cluster description specifies one or more characteristics of a cluster comprising the V2V communication device and at least one further V2V communication device. Further, the at least one processor is configured to assign to the cluster, on the basis of the received cluster description, a set of resources for V2V communication, and to send a resource assignment to the V2V communication device. The resource assignment indicates the assigned set of resources.

According to a further embodiment of the invention, a system is provided. The system comprises a V2V communication device and a network node. The V2V communication device is configured to manage a cluster comprising the V2V communication device and at least one further V2V communication device. Further, the V2V communication device is configured to determine a cluster description specifying one or more characteristics of the cluster and to indicate the cluster description over a cellular network to the network node. The network node is configured to receive the cluster description over the cellular network from the V2V communication device. Further, the network node is configured to assign to the cluster, on the basis of the received cluster description, a set of resources for V2V communication and to send a resource assignment over the cellular network to the V2V communication device. The resource assignment indicates the assigned set of resources. The V2V communication device is configured to receive the resource assignment over the cellular network from the network node. Further, the V2V communication device is configured to assign resources from the set of resources to the V2V communication devices of the cluster, and to indicate the assigned resources to the at least one further V2V communication device of the cluster.

According to a further embodiment of the invention, a computer program is provided. The computer program comprises program code to be executed by at least one processor of a V2V communication device. Execution of the program code thereby causes the V2V communication device to manage a cluster comprising the V2V communication device and at least one further V2V communication device. Further, execution of the program code causes the V2V communication device to determine a cluster description specifying one or more characteristics of the cluster and to indicate the cluster description over a cellular network to a network node. Further, execution of the program code causes the V2V communication device to receive a resource assignment over the cellular network from the network node. The resource assignment indicates a set of resources for V2V communication assigned to the cluster. Further, execution of the program code causes the V2V communication device to assign resources from the set of resources to the V2V communication devices of the cluster, and to indicate the assigned resources to the at least one further V2V communication device of the cluster.

According to a further embodiment of the invention, a computer program is provided. The computer program comprises program code to be executed by at least one processor of a network node. Execution of the program code causes the network node to receive a cluster description over a cellular network from a V2V communication device. Further, execution of the program code causes the network node to assign to the cluster, on the basis of the received cluster description, a set of resources for V2V communication and to send a resource assignment over the cellular network to the V2V communication device. The resource assignment indicates the assigned set of resources.

BRIEF DESCRIPTION OF THE DRAWINGS

FIG. 11 shows an example of a resource request frame according to an embodiment of the invention, which may be used when a cluster requires more or less resources for V2V communication.

FIG. 12 shows an example of a cluster joining request according to an embodiment of the invention.

DETAILED DESCRIPTION OF EMBODIMENTS

Figure 1:
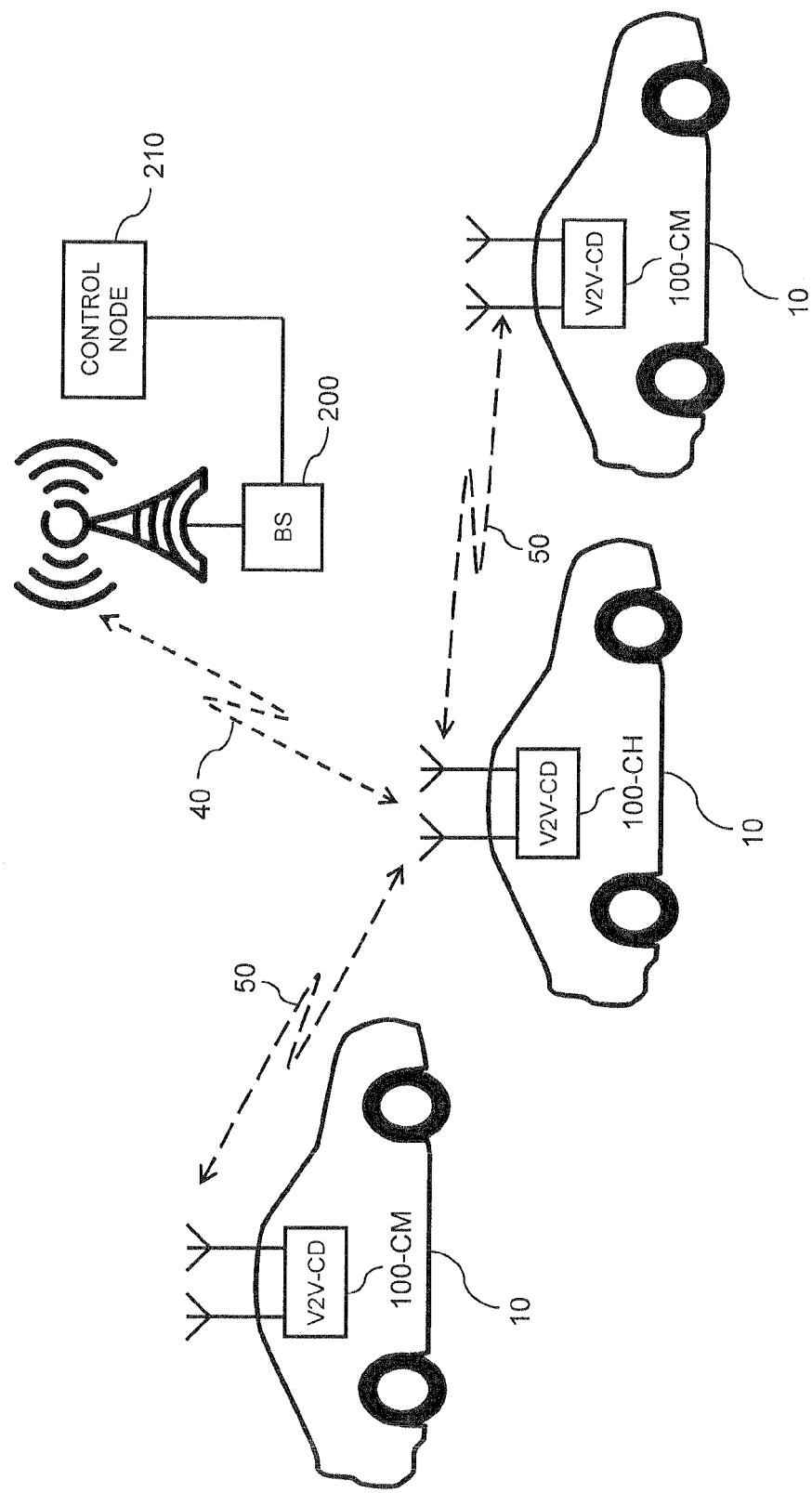
FIG. 1 schematically illustrates a V2V communication scenario in which concepts according to an embodiment of the invention may be applied.

In the following, concepts according to embodiments of the invention will be explained in more detail by referring to the accompanying drawings. The illustrated concepts relate to controlling V2V communication between vehicle-based V2V communication devices. The V2V communication may be used to implement an ITS application, e.g., based on the transmission of CAMs between vehicles.

In the illustrated concepts, it is assumed that V2V communication is based on one or more radio technologies, e.g., an ad-hoc WLAN (Wireless Local Area Network) according to IEEE 802.11p, or LTE Device-to-Device (D2D), and that at least some of the V2V communication devices are further provided with access to a cellular network, e.g., as specified by 3GPP (Third Generation Partnership Project) or by 3GPP2. The cellular network may implement one or more radio technologies, such as GSM (Global System for Mobile communication), UMTS (Universal Terrestrial Mobile Telecommunications System) or Wideband CDMA (Code Division Multiple Access), CDMA2000, WiMaX, 3GPP SAE/LTE (Service Architecture Evolution/Long Term Evolution), and/or 3GPP LTE-Advanced. Accordingly, a V2V communication device as used in the illustrated concepts typically supports at least two different radio technologies: a first radio technology for performing V2V communication over a VANET, and a second radio technology for accessing the cellular network. However, some V2V communication devices may also support only the first radio technology.

The cellular network may comprise several network nodes which control communication with UEs. For example, the SAE/LTE architecture typically includes base stations, referred to as eNB, and Mobility Management Entities (MMEs). For other radio technologies of the cellular network, similar types of nodes may be provided. In the scenarios as discussed in the following, such UEs which may communicate via the cellular network also include V2V communication devices.

In the illustrated concepts, the V2V communication is organized in clusters of V2V communication devices. Each cluster includes a V2V communication device acting as a cluster head (CH), and typically also one or more other V2V communication devices, referred to as cluster member (CM). At least the CH supports also the second radio technology for accessing the cellular network. The CMs may in turn support only the first radio technology.

To avoid collisions between V2V communication messages of an ITS application, e.g., between CAMs, the illustrated concepts involve assigning resources to a given V2V communication device, which are then used by this V2V communication device for sending V2V communication messages. Such resources can be time and/or frequency resources of the IEEE 802.11p radio technology or may be time and/or frequency resources in the radio spectrum assigned to the cellular network, e.g., of the LTE spectrum when for example using the LTE D2D radio technology. This assignment of resources is organized in two levels: On a first level sets of resources are assigned to clusters of V2V devices. This is accomplished by a network node, e.g., an eNB, MME, or some other network node which can communicate over the cellular network, e.g., a server implementing an application for controlling V2V communication. On a second level, resources from these sets are assigned to the individual V2V communication devices. This is accomplished by a V2V communication device of the cluster, referred to as cluster head (CH).

FIG. 1 schematically illustrates an exemplary V2V communication scenario in which concepts in accordance with the illustrated embodiments may be applied. By way of example, FIG. 1 shows a vehicles 10, each of which is equipped with a V2V communication device (V2V-CD). The vehicles 10, 20 may be road vehicles, such as automobiles or motorcycles, for passenger transport and/or for cargo transport. The illustrated V2V-CDs are assumed to form a cluster, of which the V2V-CD 100-CH acts as the CH, and the other V2V-CDs 100-CM are CMs.

The V2V-CDs 100-CH, 100-CM support at least the above-mentioned first radio technology. At least the V2V-CD 100-CH also supports the second radio technology and may communicate with the cellular network, represented by a base station 200-1 and a control node 210. The BS may for example be an eNB as specified for the LTE technology. The control node may for example be an MME as specified for the LTE technology.

Using the first radio technology, the V2V-CDs 100-CH, 100-CM may perform V2V communication. This may include transmitting one or more V2V communication messages 50, which may then be received by one or more of the other V2V-CDs 100-CH, 100-CM, 100-CM. Moreover, it is to be understood that further vehicles equipped with corresponding V2V-CDs communication devices could be present and could send or receive such V2V communication messages, even if they are not member of this cluster. Typically, the V2V communication messages 50 are broadcast to all other V2V communication devices within the communication range of the first radio technology for the given V2V-CD. Further, it is possible to utilize forwarding of received V2V communication messages 50, thereby forming a multi-hop mesh type network of V2V communication devices. The V2V communication messages 50 may for example correspond to CAMs as defined in ETSI TS 102637-2.

As further illustrated, the V2V-CD 100-CH acting as the CH communicates with the cellular network. Specifically, the V2V-CD 100-CH may exchange messages 40 for controlling cluster management with the above mentioned network node. In the following, it will be assumed that this network node corresponds to the BS 200. However, also another network node within the cellular network could be used for this purpose, e.g., the control node 210. Still further, also a network node with connectivity the cellular network could be used, e.g., a server with Internet connectivity.

Communication of the other V2V-CDs 100-CM of the cluster, i.e., the CMs, with the cellular network is not required.

Figure 2:
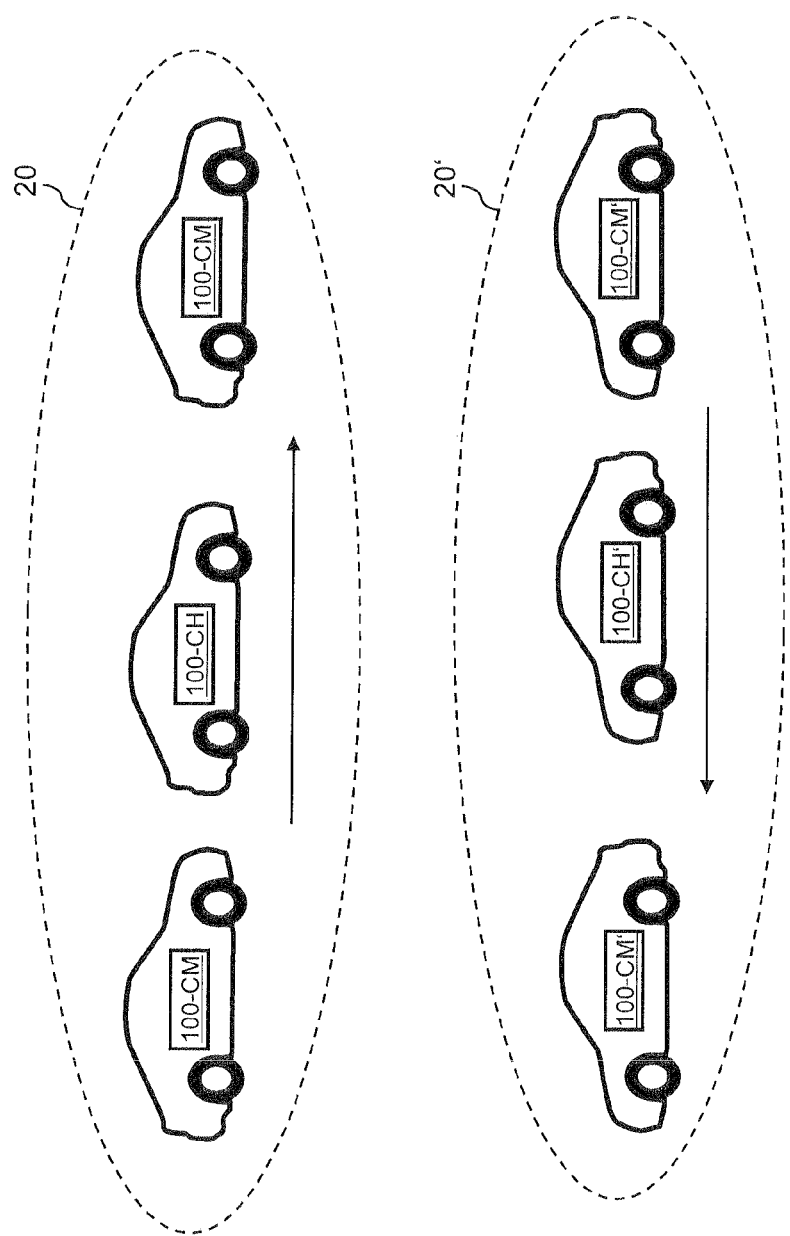
FIG. 2 schematically illustrates an exemplary scenario involving multiple clusters.

FIG. 2 shows an exemplary scenario involving multiple clusters, in particular a first cluster 20 with the V2V-CDs 100-CH, 100-CM of FIG. 1 and a second cluster 20' with V2V-CDs 100-CH, 100-CM. The V2V-CDs of the second cluster 20' may be generally similar to that of the first cluster 20. The V2V-CD 100-CH' is assumed to act as the CH of the second cluster 20', and the V2V-CDs 100-CM' are assumed to be CMs of the second cluster 20'. As in the first cluster 20, the V2V-CD 100-CH' may communicate with the BS 200 to exchange messages for controlling cluster management. Also in this case, communication of the other V2V-CDs 100-CM' of the cluster, i.e., the CMs, with the cellular network is not required.

In the example of FIG. 2, the first and second clusters 20, 20' differ with respect to the heading, i.e., direction of movement, of the vehicles. Accordingly, the association of V2V-CDs to one of the clusters may be based on the heading of the corresponding vehicle as compared to the headings of the vehicles corresponding to the V2V-CDs of the cluster, e.g., as compared to an average heading determined for the cluster. Other characteristics of the cluster may be used as well for the cluster association, e.g., position of the cluster, such as in terms of geographical latitude and longitude of the CH, dimension of the cluster, e.g., in terms of its length parallel to the heading direction and its width perpendicular thereto, the size of the cluster, e.g., in terms of the number of V2V-CDs in the cluster, or an average velocity of the vehicles corresponding to the V2V-CDs in the cluster. The association of CMs to the cluster is managed by the CH. In particular, the CH may control joining of a V2V-CD to the cluster and detect leaving of a CM from the cluster. For this purpose, the CH may maintain a list of the CM identities.

As mentioned above, the BS 200 operates to assign sets of resources to the clusters. Specifically, the BS 200 may assign different sets of resources to different clusters, thereby avoiding collisions of V2V communication messages 50 from different clusters, in the following also referred to as inter-cluster collisions. The BS 200 sends a resource assignment indicating the assigned set of resources to the CH. This may be accomplished in a broadcast message, or in a unicast message directed to only the CH for which the resource assignment is intended. However, the BS 200 may also assign the same resources to different clusters, e.g., in cases where collisions of V2V communication messages 50 from the different are unlikely or not possible due to non-overlapping communication ranges of the first radio technology. For this purpose, the BS 200 may utilize information on the cluster as provided by the CH. As a result, inter-cluster collisions can be avoided while at the same time allowing efficient resource usage, e.g., due to spatially separated reuse of resources by different clusters. The information provided by the CH may be updated regularly to take into account that the vehicles of each cluster and therefore also the cluster itself move and that the cluster size may increase by joining of new CMs or decrease by leaving of CMs. The BS 200 may then adjust the assignment of resource sets accordingly.

The assignment of different resource sets may be implemented on the basis defining separate resources according to a Time Division Multiple Access (TDMA) and/or Frequency Division Multiple Access (FDMA) scheme. For example, time slots could be defined for the IEEE 802.11p radio technology and allocated to different V2V communication devices. The duration of such time slots may be defined to be equal to 1 ms, thereby achieving a conformity with existing cellular radio technologies. In some implementations, the duration of a time slot could also be set according to the size of V2V communication messages 50 and the utilized data rate for V2V communication. For example, if the size of the V2V communication messages is 200 Byte and the data rate is 6 Mbps, a time slot size of 02667 ms could be used. The resource sets may be contiguous resource blocks, but also be combined from non-contiguous resources.

The CH of the cluster may use the set of resources indicated in the resource assignment for assigning resources therefrom to the individual V2V-CDs in the cluster. In this case, the resource assignment may be accomplished to avoid collisions of V2V communication messages 50 from V2V-CDs within the same cluster, in the following also referred to as intra-cluster collisions. For this purpose, the CH may use information on the individual V2V-CDs of the cluster, such as heading, position, velocity, or the like. The CH may determine such information by evaluating V2V communication messages 50 from the other V2V-CDs of the cluster, e.g., from CAMs. The CH may in turn indicate the assigned resources by sending a V2V communication message 50 indicating the assigned resources.

Figure 3:
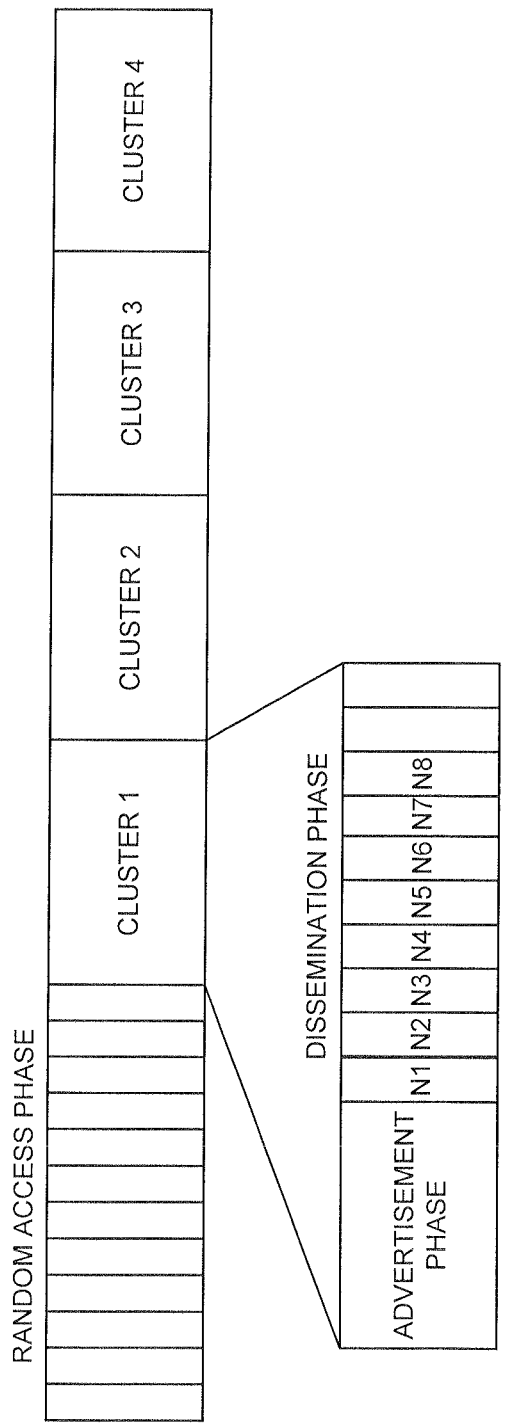
FIG. 3 illustrates an exemplary organization of communication phases according to an embodiment of the invention.

FIG. 3 illustrates an exemplary organization of communication phases according to an embodiment of the invention. In the illustrated example, the communication is organized into a broadcast phase, a random access phase, an advertisement phase for each cluster, and a dissemination phase for each cluster. In the example, four clusters are assumed to be present.

In the broadcast phase, the BS 200 broadcasts a cluster information frame over the cellular network. The cluster information frame can be received by each V2V-CD supporting the second radio technology and attached to the cell of the BS 200. The cluster information frame provides a description of each cluster having a CH in the cell of the BS 200. Such cluster description may for example specify the identity of the CH, a position of the cluster or CH, a heading of the cluster, e.g., in terms of heading of the CH or of an average heading, an average velocity of the cluster, a size of the cluster, e.g., in terms of the number V2V devices in the cluster, or the like. A V2V-CD receiving the cluster information frame may use this information for selecting a cluster for association to one of the clusters. Alternatively, the V2V-CD may decide that none of the clusters is suitable for association and decide to become the CH of a new cluster.

In the random access phase, a V2V-CD may send a request to a CH to join the cluster of the CH and thereby become a CM. A resource, in particular time slot, for sending the request is chosen randomly. The risk of collisions between different requests is assumed to be low because the joining of a cluster will typically occur less frequently than for example the sending of CAM messages. In some implementations, resources to be used for the random access phase may be configured by the BS 200.

After the random access phase a round with an advertisement phase and a dissemination phase is provided for each cluster. In the advertisement phase the CH broadcasts one or more V2V communication messages to indicate the cluster configuration and the assignment of resources to the CMs. Such messages may also be referred to as advertisement (ADV) messages. The ADV messages may also indicate the cluster description and be received by V2V-CDs which are not member of the cluster. In the latter case, such V2V-CDs may decide to join the cluster, which may be accomplished without previous reception of the cluster information frame.

The latter option is specifically useful for V2V-CDs without support of the second radio technology.

In the dissemination phase, the V2V-CDs of the cluster transmit V2V communication messages, in particular CAMs. This is accomplished in the resources assigned by the CH, e.g., in different time slots when using TDMA. The V2V communication messages may be transmitted by broadcasting so that they can be received by all other V2V communication devices in the communication range of the transmitting V2V communication device.

In the dissemination phase, the CH may also detect that a CM has left the cluster. In particular, the CH may detect that the CM did not send a V2V communication message in its assigned resource(s). If this occurs, or occurs for a predefined number of times, the CH may remove the CM from the list of CM identities.

Figure 4:
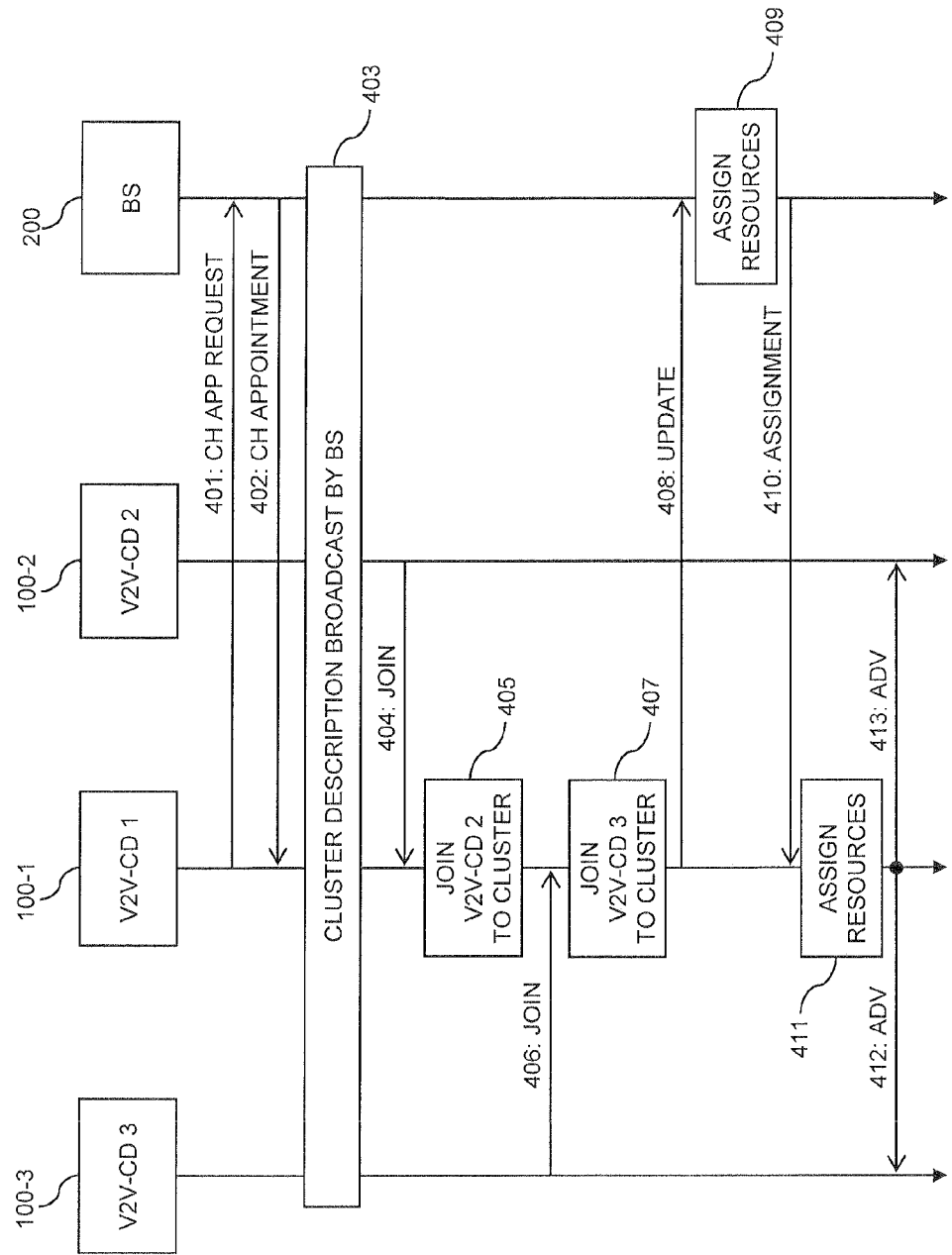
FIG. 4 shows a signalling diagram for illustrating exemplary processes for cluster formation according to an embodiment of the invention.

FIG. 4 illustrates exemplary processes for formation of a new cluster. The processes involve a first V2V-CD 100-1, a second V2V-CD 100-2, a third V2V-CD 100-3, and the BS 200. The processes may for example be performed when the first V2V-CD 100-1 decides that there is no suitable cluster to associate with and therefore decides to become the CH of a new cluster.

Using the second radio technology, the V2V-CD 100-1 may send message 401 over the cellular network to the BS 200. By message 401, the V2V-CD 100-1 may request to be appointed as a CH. Upon receiving message 401, the BS 402 may send message 402 to the V2V-CD 100-1 to confirm appointment of the V2V-CD 100-1 as the CH of the new cluster. The message 402 may also include a resource assignment, indicating a set of resources assigned to the cluster.

As indicated by step 403, the BS 200 may then broadcast a cluster description using the second radio technology, e.g., using the above-mentioned cluster information frame. In the illustrated example, the cluster description is assumed to be received by the V2V-CDs 100-2, 100-3.

Using the first radio technology, the V2V-CD 100-2 may then send message 404 to the V2V-CD 100-1, to request joining of the cluster. The message 404 may be transmitted in the above-mentioned random access phase, without requiring previous resource assignment to the V2V-CD 100-2.

In response to receiving the message 404, the V2V-CD 100-1 may join the V2V-CD 100-2 to the cluster, as indicated by step 405. This may specifically involve adding the identity of the V2V-CD 100-2 to the list of CM identities maintained by the V2V-CD 100-1.

Similarly, V2V-CD 100-3 may send message 406 to the V2V-CD 100-1, using the first radio technology, to request joining of the cluster. The message 406 may be transmitted in the above-mentioned random access phase, without requiring previous resource assignment to the V2V-CD 100-3.

In response to receiving the message 406, the V2V-CD 100-1 may join the V2V-CD 100-3 to the cluster, as indicated by step 407. This may specifically involve adding the identity of the V2V-CD 100-3 to the list of CM identities maintained by the V2V-CD 100-1.

Using the second radio technology, the V2V-CD 100-1 may then send message 408 over the cellular network to the BS 200, to update the information on the cluster. For this purpose, the V2V-CD 100-1 may determine a cluster description and include this cluster description into message 408. In the illustrated example, this cluster description would indicate that the size of the cluster has increased to three.

On the basis of the cluster description received with the message 408, the BS 200 may assign a set of resources to the cluster, as indicated by step 409. This set of resources may differ from a previously assigned set of resources, e.g., as indicated in the message 402. For example, the set of resources assigned at step 409 may include more resources to consider the increased size of the cluster.

The BS 200 then sends message 410 to the V2V-CD 100-1. The message 410 includes a resource assignment indicating the set of resources as assigned at step 409.

Having received the message 410, the V2V-CD 100-1 may assign resources to the individual V2V-CDs 100-1, 100-2, 100-3 of the cluster, as indicated by step 411. This is accomplished from the set of resources indicated in the resource assignment. For example, a corresponding time slot may be assigned to each V2V-CD 100-1, 100-2, 100-3.

The V2V-CD 100-1 may then proceed by indicating the assigned resources to the other V2V-CDs 100-2, 100-3 of the cluster. This may be accomplished during the above-mentioned advertisement phase by broadcasting an ADV message 412 using the first radio technology.

Figure 5:
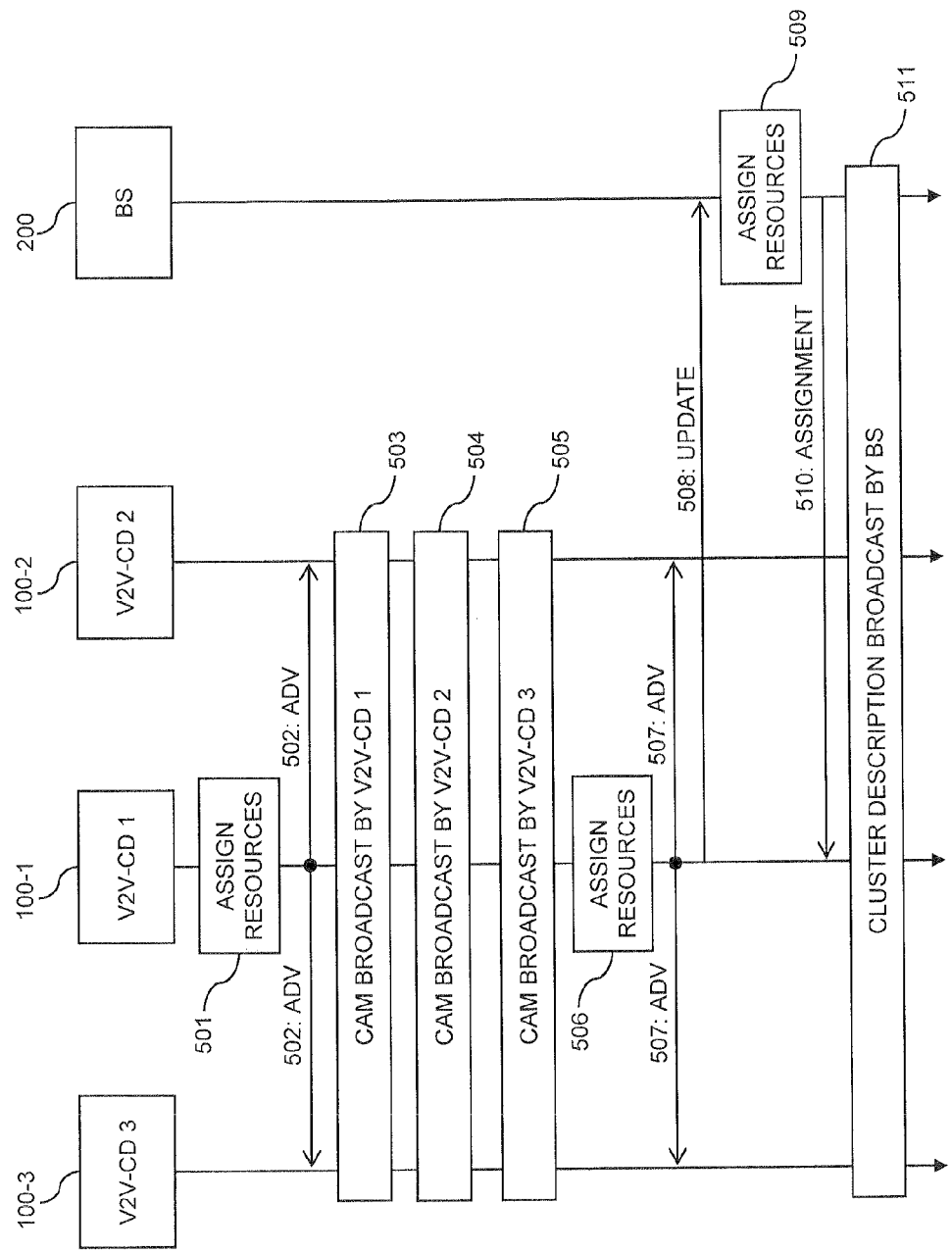
FIG. 5 shows a signalling diagram for illustrating exemplary processes for V2V communication management according to an embodiment of the invention.

FIG. 5 illustrates exemplary processes for management of V2V communication. The processes, which may for example follow the cluster formation of FIG. 4, involve the first V2V-CD 100-1, the second V2V-CD 100-2, the third V2V-CD 100-3, and the BS 200. In the processes of FIG. 5, the V2V-CD 100-1 is assumed to be initially appointed as the CH of a cluster further including the V2V-CD 100-2 and the V2V-CD 100-2.

As illustrated by step 501, the V2V-CD 100-1 may assign resources to the individual V2V-CDs 100-1, 100-2, 100-3 of the cluster. This is accomplished from the set of resources previously indicated by the BS 200 (e.g., in the processes of FIG. 4). For example, a corresponding time slot may be assigned to each V2V-CD 100-1, 100-2, 100-3.

The V2V-CD 100-1 may then proceed by indicating the assigned resources to the other V2V-CDs 100-2, 100-3 of the cluster. This may be accomplished during the above-mentioned advertisement phase by broadcasting an ADV message 502 using the first radio technology.

Using the first radio technology, each V2V-CD 100-1, 100-2, 100-3 may then broadcast a CAM, as indicated by steps 503, 504, 505. This is accomplished in the previously assigned resources, thereby avoiding collisions between the CAMs. Typically, the CAMs will be received by all other V2V-CDs 100-1, 100-2, 100-3 of the cluster, thereby spreading information through the cluster. In this way, the V2V-CD 100-1 may also receive new information on the CMs, i.e., on the V2V-CDs 100-2, 100-3, such as current position, current velocity, current heading. This information may be used by the V2V-CD 100-1 to update the cluster description.

In step 506, the V2V-CD 100-1 may assign resources to the individual V2V-CDs 100-1, 100-2, 100-3 of the cluster. This is accomplished from the set of resources previously indicated by the BS 200 (e.g., in the processes of FIG. 4). For example, a corresponding time slot may be assigned to each V2V-CD 100-1, 100-2, 100-3. In this case, the assignment of the resources may be based on the updated cluster description.

The V2V-CD 100-1 may then proceed by indicating the assigned resources to the other V2V-CDs 100-2, 100-3 of the cluster. This may be accomplished during the above-mentioned advertisement phase by broadcasting an ADV message 507 using the first radio technology.

Further, the V2V-CD 100-1 may send message 508 over the cellular network to the BS 200, using the second radio technology, to update the information on the cluster. For this purpose, the V2V-CD 100-1 may include the newly determined cluster description into the message 508. In the illustrated example, this cluster description could for example indicate a new position of the cluster, a new heading of the cluster, or a new average velocity of the cluster.

On the basis of the cluster description received with the message 508, the BS 200 may assign a set of resources to the cluster, as indicated by step 509. This set of resources may differ from a previously assigned set of resources, e.g., as indicated in the processes of FIG. 4. For example, the set of resources assigned at step 509 may include different time slots to avoid inter-cluster collisions with another cluster which is now close to the cluster of the V2V-CDs 100-1, 100-2, 100-3.

The BS 200 then sends message 510 to the V2V-CD 100-1. The message 510 includes a resource assignment indicating the set of resources as assigned at step 509.

As indicated by step 511, the BS 200 may also broadcast the cluster description using the second radio technology, e.g., in the above-mentioned cluster information frame. In the illustrated example, the cluster description may be received by other V2V-CDs which may use the cluster description to decide on association with the cluster.

Figure 6:
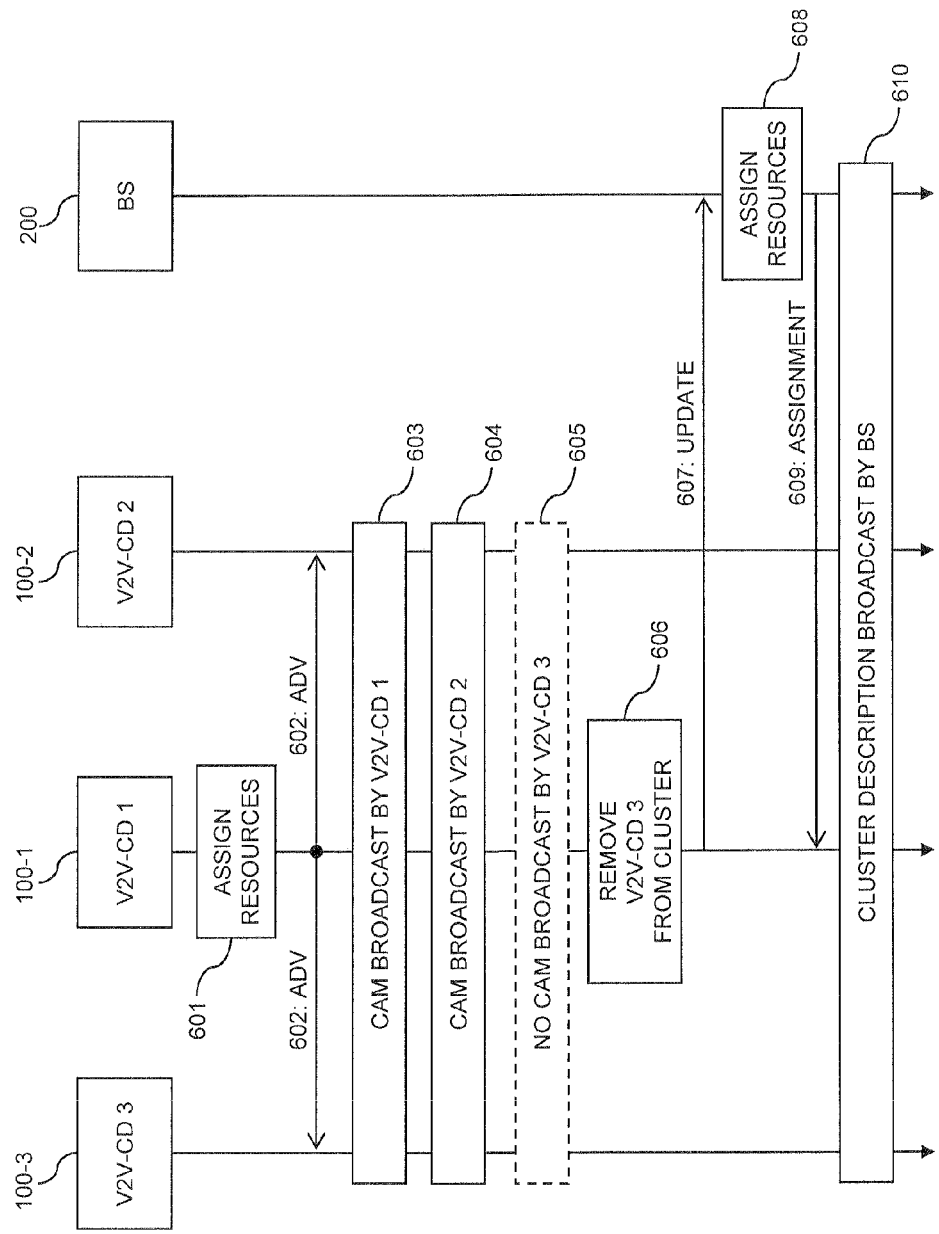
FIG. 6 shows a signalling diagram for illustrating further exemplary processes for V2V communication management according to an embodiment of the invention.

FIG. 6 illustrates further exemplary processes for management of V2V communication. The processes, which may for example follow the cluster formation of FIG. 4 or the processes of FIG. 5, involve the first V2V-CD 100-1, the second V2V-CD 100-2, the third V2V-CD 100-3, and the BS 200. In the processes of FIG. 6, the V2V-CD 100-1 is assumed to be initially appointed as the CH of a cluster further including the V2V-CD 100-2 and the V2V-CD 100-2.

As illustrated by step 601, the V2V-CD 100-1 may assign resources to the individual V2V-CDs 100-1, 100-2, 100-3 of the cluster. This is accomplished from the set of resources previously indicated by the BS 200 (e.g., in the processes of FIG. 4 or 5). For example, a corresponding time slot may be assigned to each V2V-CD 100-1, 100-2, 100-3.

The V2V-CD 100-1 may then proceed by indicating the assigned resources to the other V2V-CDs 100-2, 100-3 of the cluster. This may be accomplished during the above-mentioned advertisement phase by broadcasting an ADV message 602 using the first radio technology.

Using the first radio technology, each V2V-CD 100-1, 100-2, 100-3 could then broadcast a CAM, as indicated by steps 603, 604, 605. Similar to steps 503, 504, 505 of FIG. 5. However, in the illustrated example it is assumed that no CAM broadcast by the V2V-CD 100-3 occurs in step 605.

In step 606, the V2V-CD 100-1 use the absence of the CAM broadcast in the resources assigned to the V2V-CD 100-3 to detect leaving of the V2V-CD 100-3 from the cluster. The V2V-CD 100-1 may thus remove the V2V-CD 100-3 from the cluster. This may specifically involve deleting the identity of the V2V-CD 100-3 from the list of CM identities maintained by the V2V-CD 100-1.

The V2V-CD 100-1 may then proceed by sending message 607 over the cellular network to the BS 200, using the second radio technology, to update the information on the cluster. For this purpose, the V2V-CD 100-1 may include a newly determined cluster description into the message 607. In the illustrated example, this cluster description could for example indicate that the size of the cluster has decreased to two.

On the basis of the cluster description received with the message 607, the BS 200 may assign a set of resources to the cluster, as indicated by step 608. This set of resources may differ from a previously assigned set of resources, e.g., as indicated in the processes of FIG. 4 or 5. For example, the set of resources assigned at step 608 may include less resources to consider the decreased size of the cluster.

The BS 200 then sends message 609 to the V2V-CD 100-1. The message 609 includes a resource assignment indicating the set of resources as assigned at step 608.

As indicated by step 610, the BS 200 may also broadcast the cluster description using the second radio technology, e.g., in the above-mentioned cluster information frame. In the illustrated example, the cluster description may be received by other V2V-CDs which may use the cluster description to decide on association with the cluster.

Figure 7:
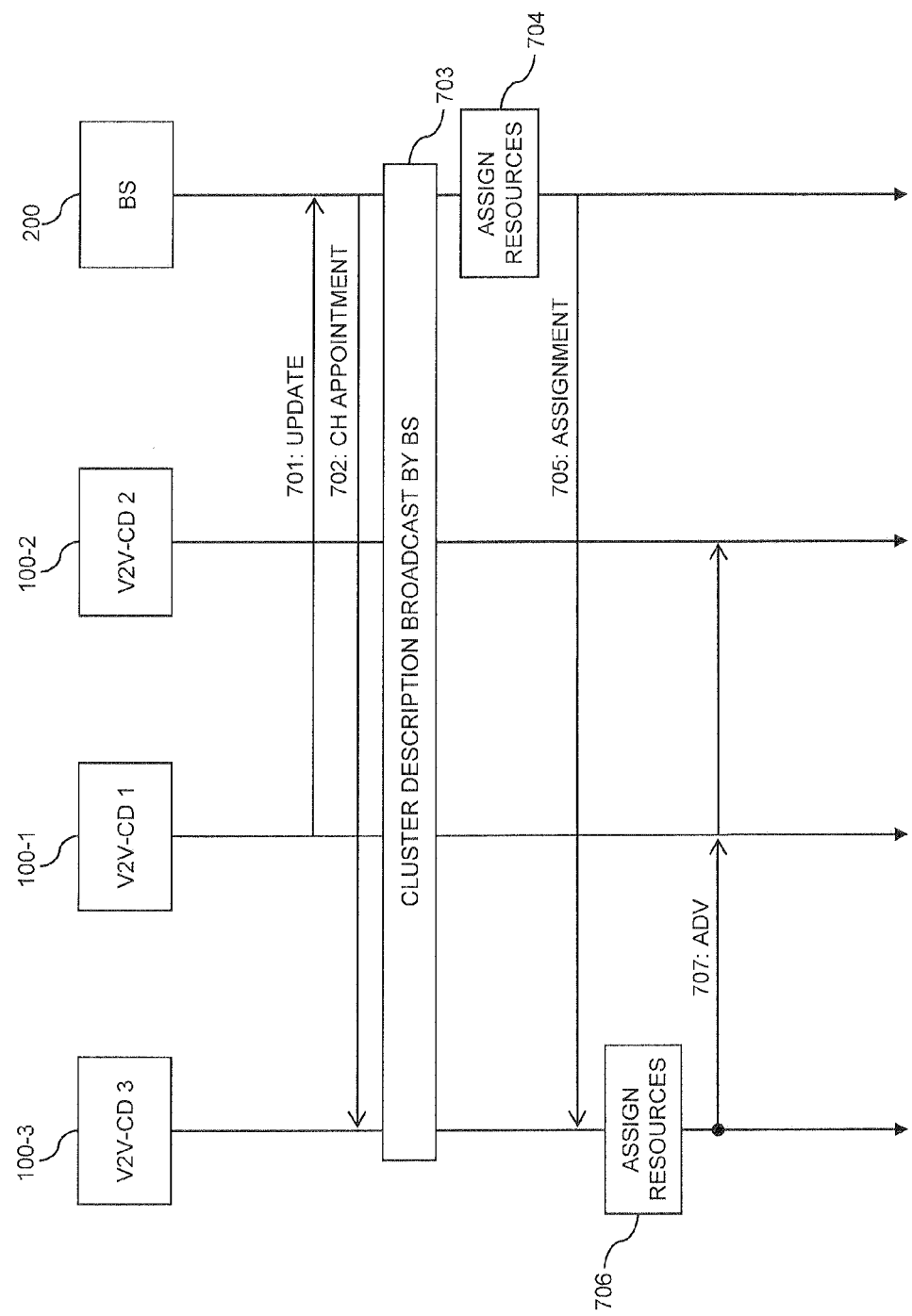
FIG. 7 shows a signalling diagram for illustrating exemplary processes for cluster re-organization according to an embodiment of the invention.

FIG. 7 illustrates exemplary processes for cluster reorganization. The processes, which may for example follow the cluster formation of FIG. 4 or the processes of FIG. 5, involve the first V2V-CD 100-1, the second V2V-CD 100-2, the third V2V-CD 100-3, and the BS 200. In the processes of FIG. 7, the V2V-CD 100-1 is assumed to be initially appointed as the CH of a cluster further including the V2V-CD 100-2 and the V2V-CD 100-2. The processes of FIG. 7 may for example be used if the V2V-CD 100-1 determines that it is no longer suitable to act as the CH of the cluster and another V2V-CD is a more appropriate candidate. This may for example occur when merging the cluster managed by the V2V-CD 100-1 to another cluster.

Using the second radio technology, the V2V-CD 100-1 may send message 701 over the cellular network to the BS 200. By message 701, the V2V-CD 100-1 may request to be de-appointed as a CH. At the same time, the message 701 may also indicate a new candidate CH, e.g., the V2V-CD 100-3. Upon receiving message 701, the BS 200 may thus send message 702 to the V2V-CD 100-1 to appoint the V2V-CD 100-3 as the CH of the new cluster. The message 702 may also include a resource assignment, indicating a set of resources assigned to the cluster.

As indicated by step 703, the BS 200 may then broadcast the new cluster description using the second radio technology. In the illustrated example, the new cluster description would indicate that the V2V-CD 100-3 is the CH of the cluster. Further, the BS 200 may assign a set of resources to the cluster, as indicated by step 704. In the illustrated example, the V2V-CDs 100-2, 100-3 are assumed to remain CMs of the cluster.

The BS 200 then sends message 705 to the V2V-CD 100-1. The message 705 includes a resource assignment indicating the set of resources as assigned at step 704.

Having received the message 705, the V2V-CD 100-1 may assign resources to the individual V2V-CDs 100-1, 100-2, 100-3 of the cluster, as indicated by step 411. This is accomplished from the set of resources indicated in the resource assignment. For example, a corresponding time slot may be assigned to each V2V-CD 100-1, 100-2, 100-3.

The V2V-CD 100-1 may then proceed by indicating the assigned resources to the other V2V-CDs 100-2, 100-3 of the cluster. This may be accomplished during the above-mentioned advertisement phase by broadcasting an ADV message 707 using the first radio technology.

Figure 8:
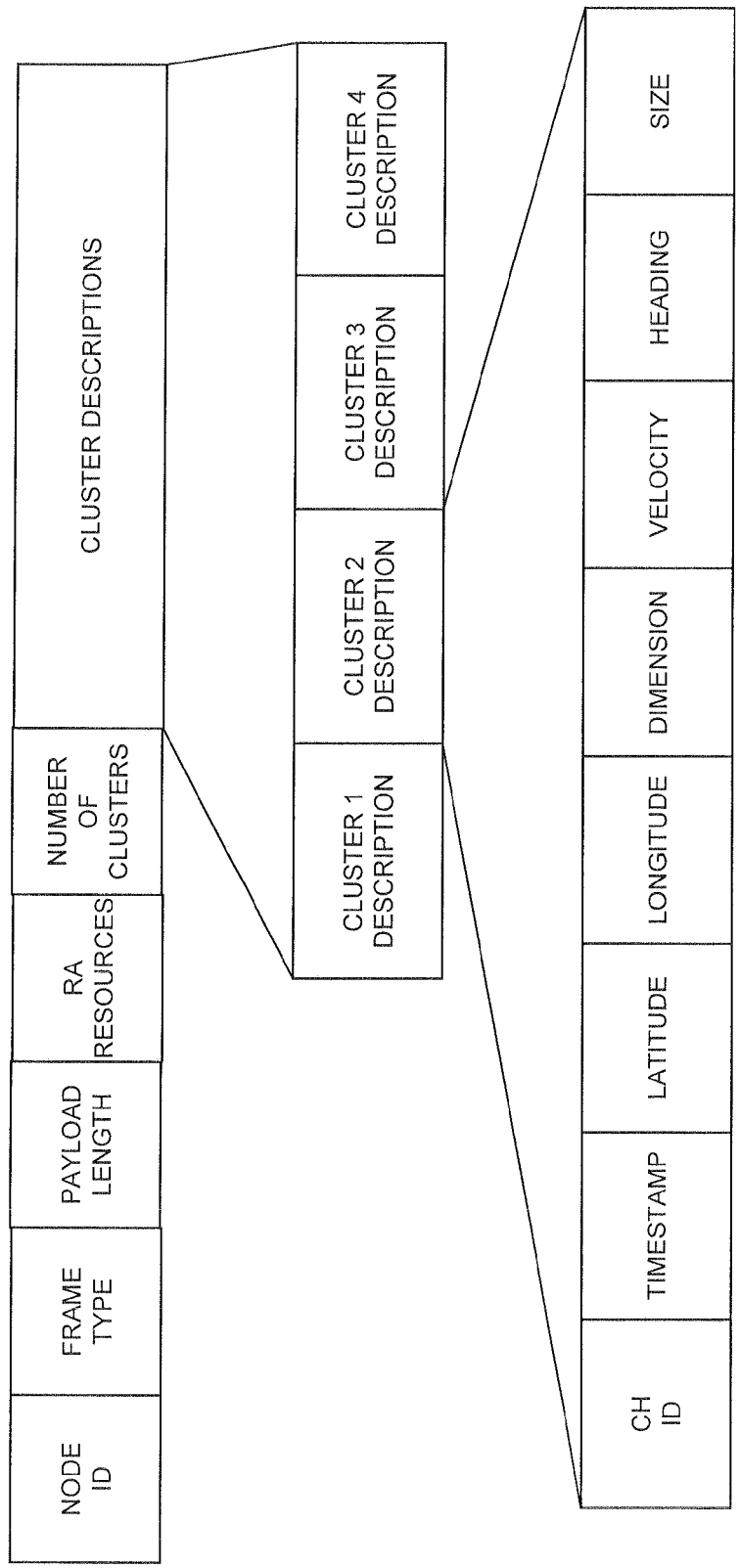
FIG. 8 shows an example of a cluster information frame according to an embodiment of the invention.

FIG. 8 illustrates an exemplary structure of the cluster information frame, which may for example be used in messages 403, 511, 610, or 703. As illustrated, the cluster information frame may include control information, such as an identity of the node transmitting the frame (NODE ID), an indication that the frame is a cluster information frame (FRAME TYPE), a length of a payload section of the frame (PAYLOAD LENGTH), an indication of resources to be used for the random access phase (RA RESOURCES), a number of the described clusters (NUMBER OF CLUSTERS), and the cluster description(s). This frame structure allows for flexibly adapting the frame to the number of clusters requiring description. In the illustrated example, the number of clusters is assumed to be four.

Each cluster description in turn specifies an identity of the CH (CH ID), a timestamp indicating the time of generating the cluster description, the position of the cluster in terms of latitude and longitude of the CH or in terms of an average latitude and longitude, a dimension of the cluster, a velocity of the cluster, e.g., in terms of an average velocity or in terms of the velocity of the CH, a heading of the cluster, e.g., in terms of an average heading or in terms of the heading of the CH, and a size of the cluster, e.g., in terms of the number of V2V-CDs in the cluster. In the above structure, the timestamp allows for assessing the actuality of the cluster description, which may differ between different cluster descriptions included in the same cluster information frame.

Figure 9:
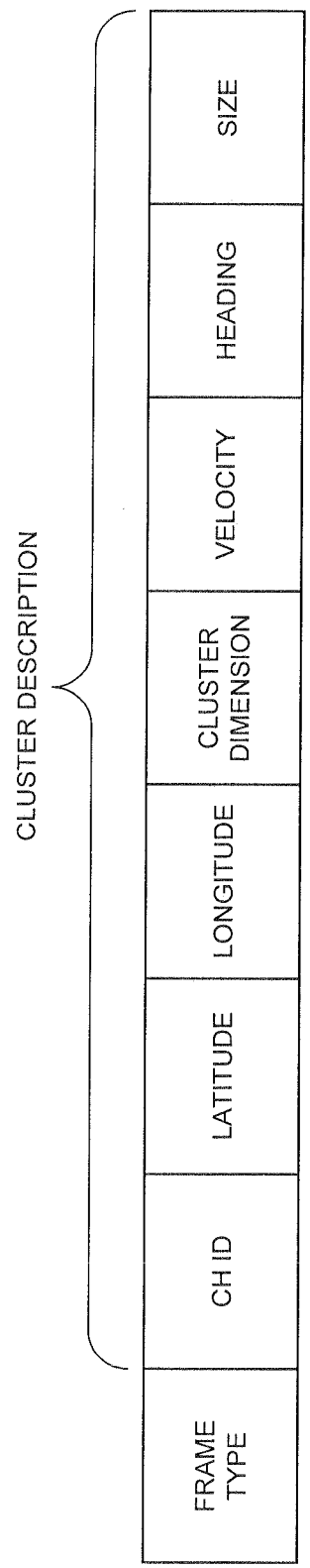
FIG. 9 shows an example of an update frame according to an embodiment of the invention.

FIG. 9 illustrates an exemplary structure of an update frame, which may for example be used in messages 408, 508, or 607. As illustrated, the update frame may include control information, such as an indication that the frame is an update frame (FRAME TYPE) for indicating a new cluster description. Further, the update frame includes the cluster description. The cluster description specifies an identity of the CH (CH ID), which is also the source of the update frame, the position of the cluster in terms of latitude and longitude of the CH or in terms of an average latitude and longitude, a dimension of the cluster, a velocity of the cluster, e.g., in terms of an average velocity or in terms of the velocity of the CH, a heading of the cluster, e.g., in terms of an average heading or in terms of the heading of the CH, and a size of the cluster, e.g., in terms of the number of V2V-CDs in the cluster.

Figure 10:
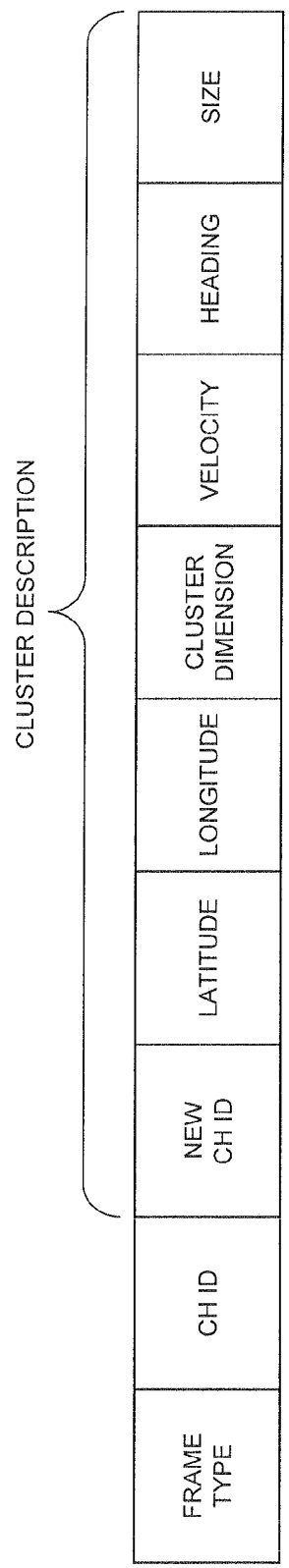
FIG. 10 shows an example of a further update frame according to an embodiment of the invention, which may be used the case of merging clusters.

FIG. 10 illustrates an exemplary structure of a further update frame, which may for example be used in the case of appointing a new CH, in particular when merging clusters, such as in in message 701. As illustrated, the update frame may include control information, such as an indication that the frame is an update frame (FRAME TYPE) for indicating a new cluster description with a new CH. The frame structure is generally similar to that of FIG. 9, but further indicates the identity of the new CH (NEW CH ID). Further, the update frame may include cluster description information for the new cluster, which may be generally to those of FIG. 9, e.g., specify the position of the cluster, a dimension of the cluster, a velocity of the cluster, a heading of the cluster, and/or a size of the cluster.

Figure 11:
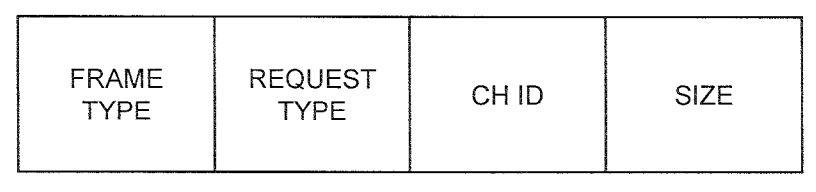

FIG. 11 illustrates an exemplary structure of a resource request frame, which may be used as a simplified update message when a different amount of resources for V2V communication is required for the cluster, but otherwise the characteristics of the cluster remain substantially unchanged. This may for example be the case in the scenario of FIG. 6, when a CM leaves the cluster and less resources are required. The resource request frame may then be used in message 607. Further, the resource request frame could also be used when a new CM joins the cluster and more resources are required. As illustrated, the resource request frame may include control information, such as an indication that the frame is a frame for transmitting a request (FRAME TYPE) and an indication that the request is a request for resources for V2V transmission (REQUEST TYPE). Further, the resource request frame includes the identity of the CH requesting the resources (CH ID), i.e., the source of the resource request. Still further, the resource request frame indicates the size of the cluster, e.g., in terms of the number of V2V-CDs in the cluster, which information may then be used for assigning an appropriate amount of resources for V2V communication to the cluster.

FIG. 12 illustrates an exemplary structure of a cluster joining request frame, which may for example be used in messages 404 or 406. As illustrated, the cluster joining request frame may include control information, such as an indication that the frame is a frame for transmitting a request (FRAME TYPE) and an indication that the request is a cluster joining request. Further, the cluster joining request frame includes the identity of the CH of the cluster to be joined (CH ID), i.e., to which the cluster joining request is addressed, and an address of the requesting V2V-CD, e.g., in the form of an IPv6 (Internet Protocol Version 6) address. The latter may then be used as the CM identity.

Figure 13:
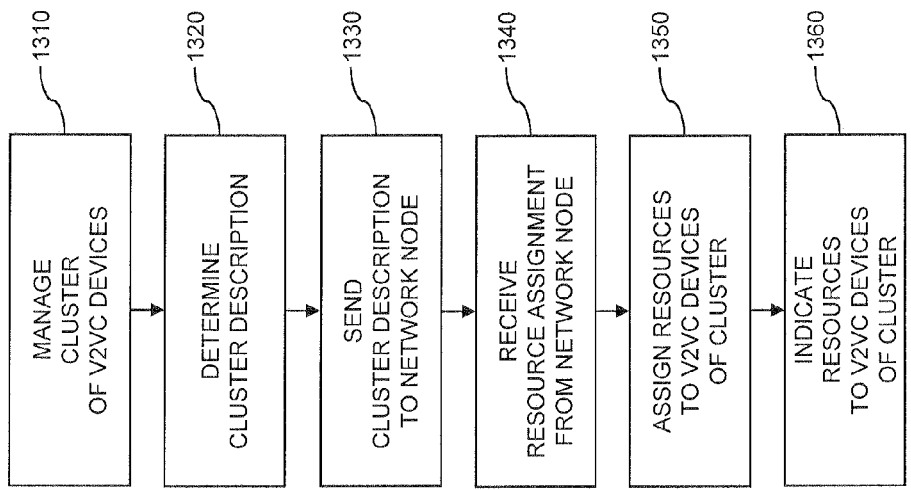
FIG. 13 shows a flowchart for illustrating a method according to an embodiment of the invention.

FIG. 13 shows a flowchart for illustrating a method which may be used for implementing the above concepts in a V2V-CD with access to a cellular network, e.g., the V2V-CD 100-CH or one of the V2V-CDs 100-1, 100-2, 100-3. The V2V-CD is assumed to be located onboard a vehicle, e.g., a road vehicle for passenger and/or cargo transport. The V2V-CD is organized in a cluster with at least one further V2V-CD. The V2V-CD may serve as the CH of the cluster, and the at least one further V2V-CD communication device may be a CM.

The cellular network may implement a one or more cellular radio technologies, e.g., GSM, UMTS or Wideband CDMA, CDMA2000, WiMaX, 3GPP SAE/LTE, and/or 3GPP LTE-Advanced. The V2V communication, in particular transmission of V2V messages such as CAMs, may be implemented using a radio technology for V2V communication, which is different from such cellular radio technology, e.g., a VANET technology, such as defined by IEEE 802.11p, or LTE D2D radio technology.

At step 1310, the V2V-CD manages the cluster of V2V-CDs. This may involve controlling the joining of other V2V-CDs to the cluster or detecting of leaving of a V2V-CD from the cluster. Also, the V2V-CD may maintain a list of V2V-CDs of the cluster, e.g., a list of CM identities.

At step 1320, the V2V-CD determines a cluster description. The cluster description specifies on or more characteristics of the cluster. For example, such characteristics may include a size of the cluster, e.g., in terms of the number of V2V-CDs in the cluster, a position of the cluster, e.g., in terms of geographical latitude and longitude, averaged over the cluster or represented by the position of the CH. Further, such characteristics may include a velocity of the cluster, averaged over the cluster or represented by the velocity of the CH, and/or a heading of the cluster, averaged over the cluster or represented by the heading of the CH.

At step 1330, the V2V-CD sends the cluster description to a network node. This is accomplished over the cellular network. The network node may be a node of the cellular network, e.g., a BS such as an eNB or a control node such as an MME. Alternatively, the network node may also be connected to the cellular network, e.g., over the Internet. The cluster description may for example be sent in an update message, such as message 408, 508, 607, or 701. A frame structure as illustrated in FIG. 9, 10, or 11 may be used for sending the cluster description.

At step 1340, the network node receives a resource assignment from the network node. This is accomplished over the cellular network. The resource assignment indicates a set of resources for V2V communication assigned to the cluster, e.g., in terms of time slots.

At step 1350, the network node assigns resources from the indicated set of resources to the V2V-CDs of the cluster. This may be accomplished on the basis of information on these V2V-CDs, e.g., position, heading, velocity.

At step 1360, the network node indicates the assigned resources to the other V2V-CDs of the cluster using the radio technology for V2V communication, e.g., in an ADV message as explained for messages 412, 502, 507, 602, 607, or 707.

The V2V-CDs of the cluster may then use the assigned resources for broadcasting V2V messages, in particular CAMs.

Figure 14:
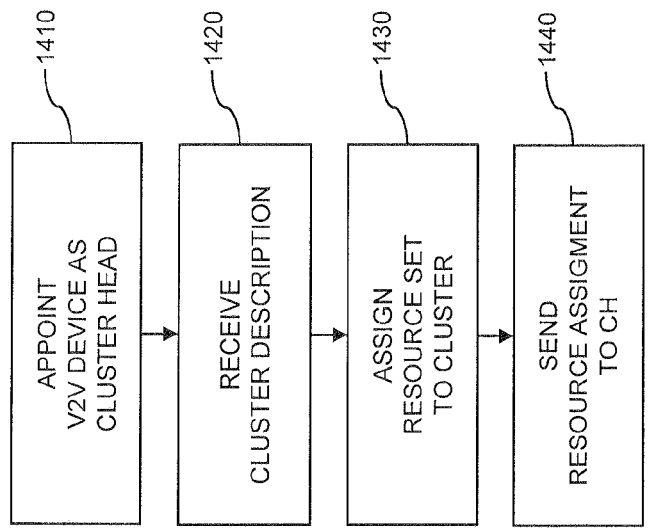
FIG. 14 shows a flowchart for illustrating a further method according to an embodiment of the invention FIG. 15 schematically illustrates a V2V communication device according to an embodiment of the invention.

FIG. 14 shows a flowchart for illustrating a method which may be used for implementing the above concepts in a network node, e.g., a node of the cellular network itself, e.g., a base station, or a node connected to the cellular network. The method may be used for controlling V2V communication as performed by V2V-CDs which are organized into clusters. The V2V-CDs are assumed to be each located onboard a vehicle, e.g., a road vehicle for passenger and/or cargo transport. The network node may be a node of the cellular network, e.g., a BS such as an eNB or a control node such as an MME. Alternatively, the network node may also be connected to the cellular network, e.g., over the Internet.

The cellular network may implement a one or more cellular radio technologies, e.g., GSM, UMTS or Wideband CDMA, CDMA2000, WiMaX, 3GPP SAE/LTE, and/or 3GPP LTE-Advanced. The V2V communication, in particular transmission of V2V messages such as CAMs, may be implemented using a radio technology for V2V communication, which is different from such cellular radio technology, e.g., a VANET technology, such as defined by IEEE 802.11p, or LTE D2D radio technology.

At step 1410, the network node may appoint a V2V-CD as a CH of a cluster. The cluster includes this V2V-CD and at least one further V2V-CD. As the CH, the V2V-CD manages the cluster of V2V-CDs. This may involve controlling the joining of other V2V-CDs to the cluster or detecting of leaving of a V2V-CD from the cluster. Also, the V2V-CD may maintain a list of V2V-CDs of the cluster, e.g., a list of CM identities.

At step 1420, the network node receives a cluster description from the V2V-CD. This is accomplished over the cellular network. The cluster description specifies on or more characteristics of the cluster. For example, such characteristics may include a size of the cluster, e.g., in terms of the number of V2V-CDs in the cluster, a position of the cluster, e.g., in terms of geographical latitude and longitude, averaged over the cluster or represented by the position of the CH. Further, such characteristics may include a velocity of the cluster, averaged over the cluster or represented by the velocity of the CH, and/or a heading of the cluster, averaged over the cluster or represented by the heading of the CH. The cluster description may for example be received in an update message, such as message 408, 508, 607, or 701. A frame structure as illustrated in FIG. 9, 10, or 11 may be used for transmitting the cluster description.

At step 1430, the network node assigns a set of resources to the cluster. This is accomplished on the basis of the received cluster description. In this way inter-cluster collisions of V2V messages may be avoided in an efficient manner, an spatial reuse of resources becomes possible.

At step 1440, the network node sends a resource assignment to the V2V-CD. This is accomplished over the cellular network. The resource assignment indicates the set of resources as assigned at step 1430.

It is to be understood that the methods of FIGS. 13 and 14 may be combined with each other, e.g., in a system including the V2V-CD managing the cluster according to the method of FIG. 13 and the network node interacting with this V2V-CD according to the method of FIG. 14.

Figure 15:
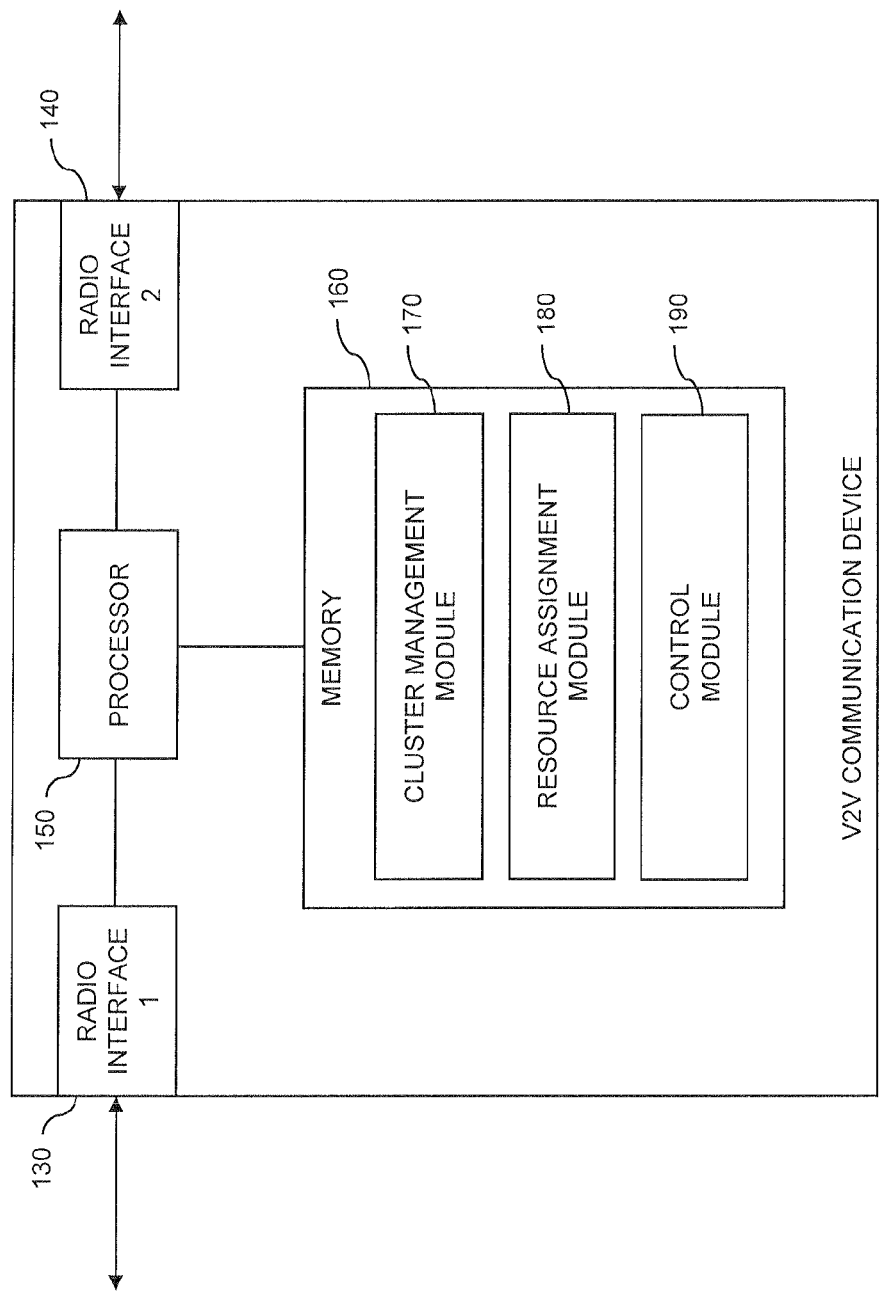

FIG. 15 illustrates an exemplary implementation of a V2V-CD. The V2V-CD may for example correspond to the above V2V-CD 100-CH or 100-1. The V2V communication device may be mounted onboard a vehicle, e.g., a road vehicle for passenger and/or cargo transport.

In the illustrated example, the V2V-CD includes a first radio interface 130 for communication with one or more other V2V-CDs. As mentioned above, this communication may utilize a VANET technology in accordance with IEEE 802.11p or other radio technology for V2V communication, e.g., based on the LTE D2D radio technology. Further, the V2V-CD includes a second radio interface 140 for communication with a cellular network. As mentioned above, the cellular network may support one or more cellular network radio technologies, e.g., GSM, UMTS or Wideband CDMA, CDMA2000, LTE, and/or LTE-Advanced.

Further, the V2V-CD includes one or more processor(s) 150 coupled to the interfaces 130, 140 and a memory 160 coupled to the processor 150. The memory 160 may include a read-only memory (ROM), e.g., a flash ROM, a random-access memory (RAM), e.g., a dynamic RAM (DRAM) or static RAM (SRAM), a mass storage, e.g., a hard disk or solid state disk, or the like. The memory 160 includes suitably configured program code modules to be executed by the processor(s) 150 so as to implement the above-described functionalities of the V2V-CD. More specifically, the program code modules in the memory 160 may include a cluster management module 170 so as to implement the above-described functionalities of managing a cluster of V2V-CDs and providing cluster descriptions. Further, the program code modules in the memory 160 may also include a resource assignment module 180 so as to implement the above-mentioned functionalities for assigning resources to V2V-CDs of the managed cluster. Still further, the program code modules in the memory 160 may also include a control module 190 so as to implement general control functionalities, such as sending a and generating messages and controlling the radio interfaces.

It is to be understood that the structure as illustrated in FIG. 15 is merely schematic and that the V2V communication device may actually include further components which, for the sake of clarity, have not been illustrated, e.g., further interfaces such as an interface with respect to vehicle systems. Also, it is to be understood that the memory 160 may include further types of program code modules, which have not been illustrated, e.g., program code modules for implementing known functionalities of a V2V-CD. According to some implementations, also a computer program may be provided for implementing functionalities of the V2V communication device, e.g., in the form of a physical medium storing one or more of the program code modules to be stored in the memory 160 or by making one or more of the program code modules available for download.

Figure 16:
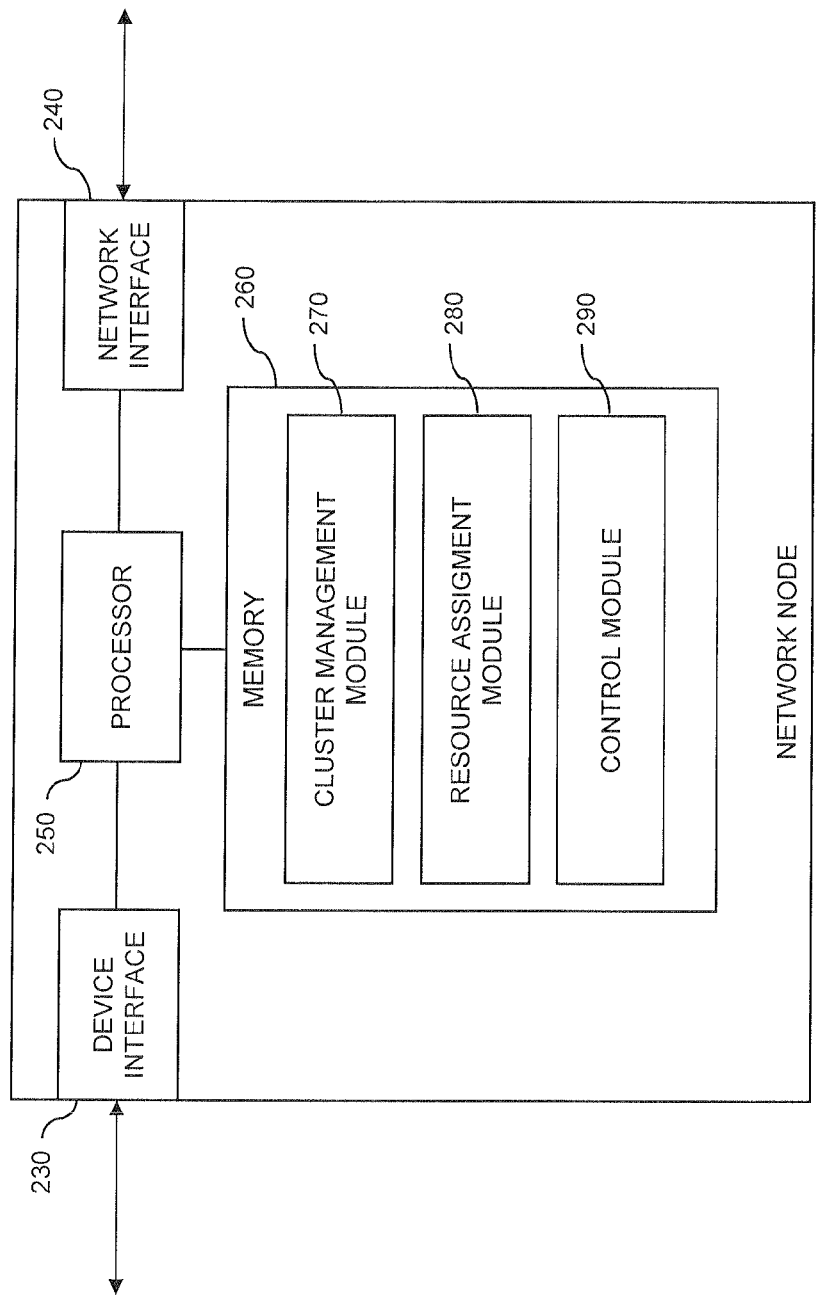
FIG. 16 schematically illustrates a network node according to an embodiment of the invention.

FIG. 16 illustrates an exemplary implementation of a network node. The node may correspond to a base station of a cellular network, e.g., to an eNB. However, similar functionalities could also be implemented in other network nodes of the cellular network, e.g., in control nodes of the cellular network, such as an MME, or even in network nodes with connectivity to the cellular network, e.g., a server with Internet connectivity. The network node may be configured to assign sets of resources to clusters of V2V-CDs and to indicate a corresponding resource assignment to a V2V-CD serving as the CH. This V2V-CD is responsible for otherwise managing the cluster, e.g., controlling joining or leaving of other V2V-CDs from the cluster. V2V communication by the V2V communication devices of the cluster may utilize a VANET technology, e.g., in accordance with IEEE 802.11p, or based on the LTE D2D radio technology.

In the illustrated example, the node includes a device interface 230 for communication with one or more V2V communication devices connected to the cellular network In addition, the node may include a network interface 240 for communication with other nodes of the cellular network. If the node implements a base station of the cellular network, the device interface may correspond to a radio interface based on a radio technology supported by the cellular network. If the node implements a control node of the cellular network, the device interface may provide a direct or indirect connection to one or more base stations of the cellular network, which in turn may provide a radio interface to one or more V2V communication devices.

Further, the node includes one or more processor(s) 250 coupled to the interfaces 230, 240 and a memory 260 coupled to the processor 250. The memory 260 may include a ROM, e.g., a flash ROM, a RAM, e.g., a DRAM or SRAM, a mass storage, e.g., a hard disk or solid state disk, or the like. The memory 260 includes suitably configured program code modules to be executed by the processor(s) 250 so as to implement the above-described functionalities for providing one or more V2V communication devices with channel information for V2V communication. More specifically, the program code modules in the memory 260 may include a cluster management module 270 for handling cluster information provided by one or more CHs and for appointing CHs. Further, the program code modules in the memory 160 may also include a resource assignment module 280 so as to implement the above-mentioned functionalities for assigning a set resources to one or more clusters. Still further, the program code modules in the memory 260 may also include a control module 290 so as to implement general control functionalities, such as sending a and generating messages and controlling the radio interfaces.

It is to be understood that the structure as illustrated in FIG. 16 is merely schematic and that the node may actually include further components which, for the sake of clarity, have not been illustrated, e.g., further interfaces. For example, multiple network interfaces could be provided which are configured to allow communication with different types of other nodes. Also, it is to be understood that the memory 260 may include further types of program code modules, which have not been illustrated, e.g., program code modules for implementing known functionalities of a base station, such as an eNB, or control node, such as an MME. According to some implementations, also a computer program may be provided for implementing functionalities of the V2V communication device, e.g., in the form of a physical medium storing one or more of the program code modules to be stored in the memory 260 or by making one or more of the program code modules available for download.

As can be seen, the concepts as described above may be used for efficiently controlling V2V communication. Specifically, V2V both inter-cluster and intra-cluster collisions of V2V communication messages may be avoided. Further, also V2V-CDs without support for cellular network communication may join a cluster.

It is to be understood that the examples and embodiments as explained above are merely illustrative and susceptible to various modifications. For example, the concepts could be used in connection with various types of cellular networks.

Moreover, it is to be understood that the above concepts may be implemented by using correspondingly designed software to be executed by one or more processors of an existing device, or by using dedicated device hardware. Also, the nodes as described herein may be implemented by a single device or by multiple devices, e.g., a device cloud or system of cooperating devices.

The invention claimed is:

1. A method for controlling vehicle-to-vehicle communication, the method comprising:
   a vehicle-to-vehicle communication device managing a cluster comprising the vehicle-to-vehicle communication device and at least one further vehicle-to-vehicle communication device;
   the vehicle-to-vehicle communication device determining a cluster description specifying one or more characteristics of the cluster, wherein the cluster description comprises at least one of a position, a velocity, or a heading of the cluster;
   the vehicle-to-vehicle communication device sending the cluster description over a cellular network to a network node;
   the vehicle-to-vehicle communication device receiving a resource assignment over the cellular network from the network node, the resource assignment indicating a set of resources for vehicle-to-vehicle communication assigned to the cluster;
   the vehicle-to-vehicle communication device assigning resources from the set of resources to the vehicle-to-vehicle communication devices of the cluster; and
   the vehicle-to-vehicle communication device indicating the assigned resources to the at least one further vehicle-to-vehicle communication device of the cluster.

2. The method according to claim 1,
   wherein the cluster description comprises a size of the cluster.

3. The method according to claim 1,
   wherein said managing of the cluster comprises control of joining of a vehicle-to-vehicle communication device to the cluster and updating the cluster description accordingly.

4. The method according to claim 1,
   wherein said managing of the cluster comprises detection of leaving of a vehicle-to-vehicle communication device from the cluster and updating the cluster description accordingly.

5. The method according to claim 1,
   wherein said assigning of the resources to the vehicle-to-vehicle communication devices of the cluster is performed on the basis of information on the vehicle-to-vehicle communication devices of the cluster.

6. The method according to claim 5,
   wherein said information on the vehicle-to-vehicle communication devices comprises a position, velocity, and/or heading of each vehicle-to-vehicle communication device of the cluster.

7. The method according to claim 1,
   wherein the vehicle-to-vehicle communication devices of the cluster broadcast vehicle-to-vehicle communication messages in the assigned resources.

8. The method according to claim 1, comprising:
   the network node receiving the cluster description over the cellular network;
   on the basis of the cluster description, the network node assigning the set of resources to the cluster; and the network node sending the resource assignment over the cellular network to the vehicle-to-vehicle communication device, the resource assignment indicating the assigned set of resources.

9. A method for controlling vehicle-to-vehicle communication, the method comprising:
a network node receiving a cluster description over a cellular network from a vehicle-to-vehicle communication device, the cluster description specifying one or more characteristics of a cluster comprising the vehicle-to-vehicle communication device and at least one further vehicle-to-vehicle communication device, wherein the cluster description comprises at least one of a position, a velocity, or a heading of the cluster;
on the basis of the received cluster description, the network node assigning to the cluster a set of resources for vehicle-to-vehicle communication; and
the network node sending a resource assignment over the cellular network to the vehicle-to-vehicle communication device, the resource assignment indicating the assigned set of resources.

10. The method according to claim 9, wherein the cluster description comprises a size of the cluster.

11. The method according to claim 9, wherein the resource set assigned to the cluster is different from a resource set assigned to one or more other clusters of vehicle-to-vehicle communication devices.

12. The method according to claim 9, comprising:
the node appointing the vehicle-to-vehicle communication device as being responsible for managing the cluster.

13. The method according to claim 12, wherein said appointing is performed in response to a request from the vehicle-to-vehicle communication device.

14. The method according to claim 9, in response to a request from the vehicle-to-vehicle communication device, the network node appointing another vehicle-to-vehicle communication device as being responsible for managing the cluster.

15. The method according to claim 9, wherein the vehicle-to-vehicle communication devices of the cluster broadcast vehicle-to-vehicle communication messages in the assigned resources.

16. A vehicle-to-vehicle communication device, the vehicle-to-vehicle communication device comprising:
a first radio interface for vehicle-to-vehicle communication with one or more other vehicle-to-vehicle communication devices;
a second radio interface for communication over a cellular network with a network node; and
at least one processor, the at least one processor being configured to perform operations comprising:
managing a cluster comprising the vehicle-to-vehicle communication device and at least one of the other vehicle-to-vehicle communication devices,
determining a cluster description specifying one or more characteristics of the cluster, wherein the cluster description comprises at least one of a position, a velocity, or a heading of the cluster,
indicating the cluster description to the network node,
receiving a resource assignment from the network node, the resource assignment indicating a set of resources for vehicle-to-vehicle communication assigned to the cluster,
assigning resources from the set of resources to the vehicle-to-vehicle communication devices of the cluster, and
indicating the assigned resources to the at least one further vehicle-to-vehicle communication device of the cluster.

17. The vehicle-to-vehicle communication device according to claim 16, wherein the cluster description comprises a size of the cluster.

18. The vehicle-to-vehicle communication device according to claim 16, wherein the at least one processor is configured to manage the cluster by controlling joining of a vehicle-to-vehicle communication device to the cluster and updating the cluster description accordingly.

19. The vehicle-to-vehicle communication device according to claim 16, wherein the at least one processor is configured to manage the cluster by detecting leaving of a vehicle-to-vehicle communication device from the cluster and updating the cluster description accordingly.

20. The vehicle-to-vehicle communication device according to claim 16, wherein the at least one processor is configured to perform the assigning of the resources to the vehicle-to-vehicle communication devices of the cluster on the basis of information on the vehicle-to-vehicle communication devices of the cluster.

21. The vehicle-to-vehicle communication device according to claim 20, wherein said information on the vehicle-to-vehicle communication devices comprises a position, velocity, and/or heading of each vehicle-to-vehicle communication device of the cluster.

22. The vehicle-to-vehicle communication device according to claim 16, wherein the vehicle-to-vehicle communication devices of the cluster broadcast vehicle-to-vehicle communication messages in the assigned resources.

23. A network node comprising:
an interface for communication over a cellular network with a vehicle-to-vehicle communication device; and
at least one processor, the at least one processor being configured to perform operations comprising:
receiving, from the vehicle-to-vehicle communication device, a cluster description specifying one or more characteristics of a cluster comprising the vehicle-to-vehicle communication device and at least one further vehicle-to-vehicle communication device, wherein the cluster description comprises at least one of a position, a velocity, or a heading of the cluster,
on the basis of the received cluster description, assigning to the cluster a set of resources for vehicle-to-vehicle communication, and
sending a resource assignment indicating the assigned set of resources to the vehicle-to-vehicle communication device.

24. The network node according to claim 23, wherein the cluster description comprises a size of the cluster.

25. The network node according to claim 23, wherein the resource set assigned to the cluster is different from a resource set assigned to one or more other clusters of vehicle-to-vehicle communication devices.

26. The network node according to claim 23,
wherein the at least one processor is configured to appoint the vehicle-to-vehicle communication device as being responsible for managing the cluster.

27. The network node according to claim 26,
wherein said appointing is performed in response to a request from the vehicle-to-vehicle communication device.

28. The network node according to claim 23,
wherein the at least one processor is configured to appoint, in response to a request from the vehicle-to-vehicle communication device, another vehicle-to-vehicle communication device as being responsible for managing the cluster.

29. The network node according to claim 23,
wherein the vehicle-to-vehicle communication devices of the cluster broadcast vehicle-to-vehicle communication messages in the assigned resources.

30. A system, comprising:
a vehicle-to-vehicle communication device; and
a network node,
wherein the vehicle-to-vehicle communication device is configured to perform operations comprising:
 managing a cluster comprising the vehicle-to-vehicle communication device and at least one of the other vehicle-to-vehicle communication devices,
 determining a cluster description specifying one or more characteristics of the cluster, wherein the cluster description comprises at least one of a position, a velocity, or a heading of the cluster;
 indicating the cluster description over a cellular network to the network node,
 receiving a resource assignment over the cellular network from the network node, the resource assignment indicating a set of resources for vehicle-to-vehicle communication,
 assigning resources from the set of resources to the vehicle-to-vehicle communication devices of the cluster, and
 indicating the assigned resources to the at least one further vehicle-to-vehicle communication device of the cluster;
wherein the network node is configured to:
 receiving the cluster description over the cellular network from the vehicle-to-vehicle communication device,
 assigning the set of resources on the basis of the received cluster description, and
 sending the resource assignment over the cellular network to the vehicle-to-vehicle communication device, the resource assignment indicating the assigned set of resources.

* * * * *